United States Patent
van Vredendaal et al.

(10) Patent No.: US 11,501,212 B2
(45) Date of Patent: Nov. 15, 2022

(54) METHOD FOR PROTECTING A MACHINE LEARNING MODEL AGAINST EXTRACTION

(71) Applicant: NXP B.V., Eindhoven (NL)

(72) Inventors: Christine van Vredendaal, Veldhoven (NL); Wilhelmus Petrus Adrianus Johannus Michiels, Reusel (NL)

(73) Assignee: NXP B.V., Eindhoven (NL)

(*) Notice: Subject to any disclaimer, the term of this patent is extended or adjusted under 35 U.S.C. 154(b) by 422 days.

(21) Appl. No.: 16/853,826

(22) Filed: Apr. 21, 2020

(65) Prior Publication Data

US 2021/0326748 A1    Oct. 21, 2021

(51) Int. Cl.
  *G06N 20/00*    (2019.01)
  *G06K 9/62*    (2022.01)

(52) U.S. Cl.
  CPC ........... *G06N 20/00* (2019.01); *G06K 9/6267* (2013.01)

(58) Field of Classification Search
  CPC .................................................. G06N 20/00
  See application file for complete search history.

(56) References Cited

U.S. PATENT DOCUMENTS

| | | | |
|---|---|---|---|
| 6,243,696 | B1 | 6/2001 | Keeler et al. |
| 8,219,560 | B2 | 7/2012 | Abhyankar et al. |
| 10,764,313 | B1* | 9/2020 | Mushtaq ................ G06N 20/00 |
| 2018/0018577 | A1 | 1/2018 | Fink et al. |
| 2019/0171929 | A1* | 6/2019 | Abadi ..................... G06N 3/084 |
| 2019/0258755 | A1 | 8/2019 | Minwalla et al. |
| 2020/0259851 | A1* | 8/2020 | Manoselvam ........ G06F 21/552 |
| 2022/0050897 | A1* | 2/2022 | Gaddam ................ G06N 3/006 |
| 2022/0094710 | A1* | 3/2022 | Riahi Manesh ..... G06K 9/6256 |

FOREIGN PATENT DOCUMENTS

AU    2018264012 B1    5/2019

OTHER PUBLICATIONS

S. Qiu et al., "Review of Artificial Intelligence Adversarial Attack and Defense Technologies," Applied Sciences, MDPI, published Mar. 4, 2019 (Year: 2019).*
Y. Lan et al., "A New Model of Combining Multiple Classifiers Based on Neural Network," IEEE 2013 (Year: 2013).*

(Continued)

*Primary Examiner* — Eric J Yoon
(74) *Attorney, Agent, or Firm* — Daniel D. Hill (57) ABSTRACT

A method for protecting a first machine learning (ML) model is provided. In the method, a dataset of non-problem domain (NPD) data is selected from a large dataset using a second ML model. The second ML model classifies the large dataset into NPD classifications and PD classifications. The PD classified data is excluded. A distinguisher includes a third ML model that is trained using selected NPD data from the large dataset. The distinguisher receives input samples that are intended for the first ML model. The third ML model provides either a PD classification or NPD classification in response to receiving each input sample. An indication of a likely extraction attempt may be provided when a predetermined number of NPD classifications are provided. The method provides an efficient way to create a training dataset for a distinguisher and for protecting a ML model with the distinguisher.

20 Claims, 3 Drawing Sheets

(56) References Cited

OTHER PUBLICATIONS

Correia-Silva, Jacson Rodrigues et al.; "Copycat CNN: Stealing Knowledge by Persuading Confession with Random Non-Labeled Data;" Submitted on Jun. 14, 2018; arXiv.org > cs > arXiv:1806.05476; Computer Science, Computer Vision and Pattern Recognition; DOI: 10.1109/IJCNN.2018.8489592.

Deng, Jia et al.; "ImageNet: A Large-Scale Hierarchical Image Database;" 2009 IEEE Conference on Computer Vision and Pattern Recognition; Jun. 20-25, 2009, Miami, Florida; DOI: 10.1109/CVPR.2009.5206848.

Kotthoff, Lars et al.; "Auto-WEKA 2.0: Automatic Model Selection and Hyperparameter Optimization in WEKA;" Journal of Machine Learning Research 17 (2016) 1-5; Submitted May 2016; Revised Nov. 2016; Published Nov. 2016.

Orekondy, Tribhuvanesh et al.; "Knockoff Nets: Stealing Functionality of Black-Box Models;" 2019 IEEE/CVF Conference on Computer Vision and Pattern Recognition (CVPR); Jun. 15-20, 2019, Long Beach, California; DOI: 10.1109/CVPR.2019.00509.

Szegedy, Christine et al.; "Rethinking the Inception Architecture for Computer Vision;" 2016 IEEE Conference on Computer Vision and Pattern Recognition (CVPR); Jun. 27-30, 2016, Las Vegas, Nevada; DOI: 10.1109/CVPR.2016.308.

Thornton, Chris et al.; "Auto-WEKA: Combined Selection and Hyperparameter Optimization of Classification Algorithms;" Submitted on Aug. 18, 2012(v1); last revised Mar. 6, 2013(v1); arXiv.org > cs > arXiv:1208.3719.

Tramer, Florian et al.; "Stealing Machine Learning Models via Prediction APIs;" Proceedings of 25th USENIX Security Symposium, Aug. 10-12, 2016, Austin, Texas.

U.S. Appl. No. 16/378,942; Inventor Christine van Vredendaal, et al.; "Method For Protecting A Machine Learning Model Against Extraction;" filed Apr. 9, 2019.

\* cited by examiner

METHOD FOR PROTECTING A MACHINE LEARNING MODEL AGAINST EXTRACTION

BACKGROUND

Field

This disclosure relates generally to machine learning, and more particularly, to a method for protecting a machine learning model against extraction.

Related Art

Machine learning is used to approximate functions that cannot be derived analytically, such as forecasting and classification. Generally, a machine learning (ML) model is trained, at least partly, before it is used. Training data is used for training a ML model. Machine learning models may be classified by how they are trained. Supervised learning, unsupervised learning, semi-supervised learning, and reinforcement learning are examples of training techniques. The effectiveness of the ML model is influenced by its accuracy, execution time, storage requirements, and the quality of the training data. The expertise, time, and expense required for compiling a representative training set of data, labelling the data results in the training data, and the ML model obtained from the training data are valuable assets.

Protecting a ML model from attacks has become a problem. When ML is provided as a service, a user only has access to the inputs and outputs of the ML model. Model extraction is an attack that results in a near identical copy of the ML model being produced. When ML is provided as a service, an attacker may only have access to the inputs and outputs of the ML model. To extract the model when the ML model is provided as a service, valid queries are provided to the model and the resulting output is compiled. An attacker does not have to provide problem-domain (PD) inputs to the model. An attacker can also copy the model using non-problem-domain (NPD) inputs. Even when an attacker is just given access to the inputs and outputs, the ML model can be relatively easily copied. Once an attacker has copied the model, it can be illegitimately used and monetized. Also, an adversary can apply model extraction to gain white-box access and thereby develop other attacks, such as attacks that can fool the original model to mis-predict.

Countermeasures exist to protect a ML model from being extracted by an attacker. However, many of these countermeasures require the ML model to be modified, which can affect the accuracy of the ML model.

Therefore, a need exists for a way to protect a ML model against extraction that does not required the ML model to be modified.

BRIEF DESCRIPTION OF THE DRAWINGS

The present invention is illustrated by way of example and is not limited by the accompanying figures in which like references indicate similar elements. Elements in the figures are illustrated for simplicity and clarity and have not necessarily been drawn to scale.

DETAILED DESCRIPTION

Generally, there is provided, a method for protecting a first ML model, trained on a first dataset, against extraction when the first ML model is not directly accessible, such as when the first ML model is being provided as a service. The method uses a distinguisher having a trained ML model to detect if input samples intended for the trained first ML model are in the PD of the trained first ML model. To construct an ML model to function as a distinguisher, a second ML model and training dataset for training the second ML model are selected. In one embodiment, the second ML model may be a pretrained publicly available model that is trained to classify input samples from a second dataset into many classifications. The second ML model with the second dataset is used to provide a third dataset for training a third ML model. The third dataset is then used to train a third ML model to function as the distinguisher. Accordingly, in the method, the second trained ML model is used to classify samples from the first dataset into a first plurality of classifications. In addition, the trained second ML model is used to classify samples from the second dataset into a second plurality of classifications. Classifications of the second plurality of classifications that are not in the PD of the first trained ML model are used to create a third dataset. Note that there may not be any PD classifications of the first plurality of classifications in the second plurality of classifications. The third ML model is trained using the third dataset. After training, the trained third ML model functions as a distinguisher to pre-screen input samples for the trained first ML model. The trained third ML model determines if input samples are in the PD of the trained first ML model. If an input sample is classified by the distinguisher as being in the PD, the input sample is provided to the trained first ML model for classification. If an input sample is classified as not being in the PD of the trained first ML model, then an indication of a likely extraction attack on the first ML model is provided.

By first classifying the training dataset for training the distinguisher into multiple classifications, it is easier and more efficient to filter the training dataset into PD and NPD data. Also, creating the third training dataset for the distinguisher in this way can be automated, eliminating the need for tedious and time-consuming manual sorting of PD and NPD data.

In accordance with an embodiment, there is provided, a method for protecting a first machine learning (ML) model from extraction, the method including: receiving a trained first ML model that was trained using a first dataset comprising a first plurality of problem domain samples within a problem domain of the first ML model; receiving a second dataset comprising a plurality of samples; using a trained second ML model, classifying the first dataset into a first plurality of classifications, wherein each classification of the first plurality of classifications comprises one or more samples assigned to each of the first plurality of classifications; using the trained second ML model, classifying the second dataset as a second plurality of classifications; selecting classifications of the second plurality of classifications that are not classifications of the problem domain of the first dataset; creating a third dataset comprising the first dataset and the selected classifications of the second plurality of classifications; training a third ML model using the third dataset to classify input samples as problem domain samples of the first ML model and non-problem domain samples of the first ML model; wherein the trained third ML model is used to distinguish whether an input sample intended as an input for the first ML model during inference operation of the first ML model, is a problem domain sample or a non-problem domain sample; wherein the input sample is provided to the first ML model when the input sample is classified as a problem domain sample; and wherein an indication of a likely extraction attack directed at the first ML model is provided when the input sample is classified as a non-problem domain sample. Classifying the first dataset into a first plurality of classifications may further include providing a confidence level that the one or more samples belongs to the assigned classification. Providing an indication of a likely extraction attack directed at the first ML model when the input sample is classified as a non-problem domain sample may further include providing an indication of a likely extraction attack when the first input sample is one of a plurality of non-problem domain samples classified by the third ML model. Using a second trained ML model trained on the second dataset may further include using a publicly available pretrained ML model. Using a second trained ML model may further include: collecting a plurality of data samples; and training a ML model on the plurality of data samples to produce the second trained ML model. Using the selected classifications of the second plurality of classifications to create a third dataset may further include selecting a plurality of samples to be removed from the third dataset so that the third dataset comprises a substantially same number of samples as the first dataset. Selecting the plurality of samples to be removed may further include randomly selecting the plurality of samples to be removed. Selecting the plurality of samples to be removed may further include selecting the plurality of samples based on an associated confidence that each of the plurality of samples belongs to an assigned classification. Selecting the plurality of samples to be removed may further include selecting the plurality of samples based on a distribution of the first dataset. The third dataset may include images.

In another embodiment, there is provided, a method for protecting a first machine learning (ML) model from extraction, the method including: receiving a trained first ML model trained using a first dataset comprising a first plurality of problem domain samples within a problem domain of the first ML model; receiving a second dataset comprising a plurality of samples; using a second trained ML model trained on the second dataset, classifying the first dataset into a first plurality of classifications, wherein each classification of the first plurality of classifications comprises one or more samples assigned to each of the first plurality of classifications; using the second trained ML model, classifying the second dataset as a second plurality of classifications; selecting classifications of the second plurality of classifications that are not classifications of the problem domain of the first dataset; creating a third dataset comprising the first dataset and the selected classifications of the second plurality of classifications; training a third ML model using the third dataset to classify input samples as problem domain samples of the first ML model and non-problem domain samples of the first ML model; wherein the trained third ML model is used to distinguish whether a plurality of input samples intended as an input for the first ML model during inference operation of the first ML model, are problem domain samples or non-problem domain samples; wherein each of the input samples are provided to the first ML model that are classified as problem domain samples; and wherein an indication of a likely extraction attack directed at the first ML model is provided when a predetermined number of input samples are classified as non-problem domain samples. Classifying the first dataset into a first plurality of classifications may further include providing a confidence level that the one or more samples belongs to the assigned classification. Using a second trained ML model may further include using a publicly available pretrained ML model. Using a second trained ML model may further include: collecting a plurality of data samples; and training a ML model on the plurality of data samples to produce the second trained ML model. Using the selected classifications of the second plurality of classifications to create a third dataset may further include selecting a plurality of samples to be removed from the third dataset so that the third dataset comprises a substantially same number of samples as the first dataset. Selecting the plurality of samples to be removed may further include randomly selecting the plurality of samples to be removed. Selecting the plurality of samples to be removed may further include selecting the plurality of samples based on an associated confidence that each of the plurality of samples belongs to an assigned classification. Selecting the plurality of samples to be removed may further include selecting the plurality of samples based on a distribution of the first dataset. The method may further include implementing the method using a computer program comprising executable instructions that, when executed by a processor, carry out the method.

In yet another embodiment, there is provided, a computer program including executable instructions on a non-transitory machine-readable storage medium for protecting a first machine learning (ML) model from extraction, the computer program including: instructions for receiving a trained first ML model trained using a first dataset comprising a first plurality of problem domain samples within a problem domain of the first ML model; instructions for receiving a second dataset comprising a plurality of samples; instructions for using a second trained ML model, classifying the first dataset into a first plurality of classifications, wherein each classification of the first plurality of classifications comprises one or more samples assigned to each of the first plurality of classifications; instructions for using the second trained ML model, classifying the second dataset as a second plurality of classifications; instructions for selecting classifications of the second plurality of classifications that are not classifications of the problem domain of the first dataset; instructions for creating a third dataset comprising the first dataset and the selected classifications of the second plurality of classifications; instructions for training a third ML model using the third dataset to classify input samples as problem domain samples of the first ML model and non-problem domain samples of the first ML model; wherein the trained third ML model is used to distinguish whether an input sample intended as an input for the first ML model during inference operation of the first ML model, is a problem domain sample or a non-problem domain sample; wherein the input sample is provided to the first ML model when the input sample is classified as a problem domain sample; and wherein an indication of a likely extraction attack directed at the first ML model is provided when the input sample is classified as a non-problem domain sample.

Figure 1:
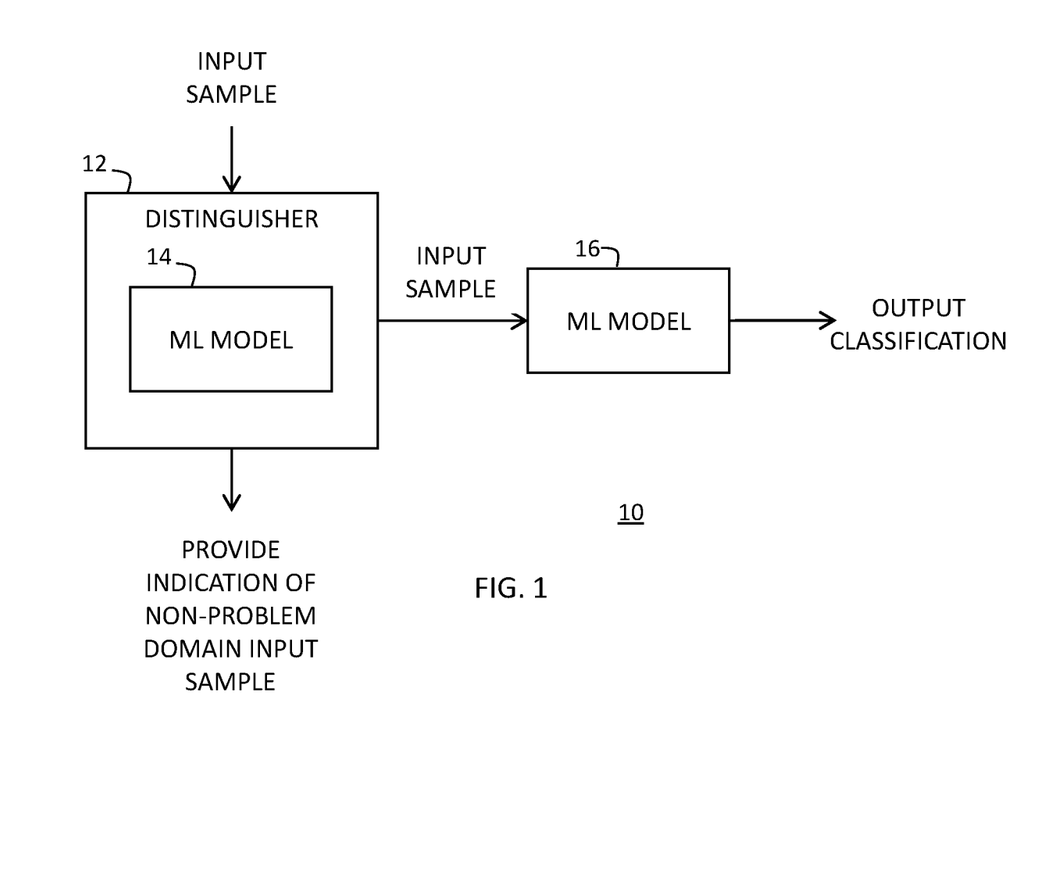
FIG. 1 illustrates a system for protecting a ML model from extraction in accordance with an embodiment.

FIG. 1 illustrates system 10 for protecting ML model 16 from extraction in accordance with an embodiment. System 10 includes distinguisher 12 and trained ML model 16. In one embodiment, trained ML model 16 may be trained with a first dataset to classify input samples, such as images. The images may include any type of image such as photos, videos, paintings, drawings, etc. ML model 16 may be based on a neural network or another type of ML algorithm. The trained ML model 16 may be provided as a service so that an attacker only has access to the inputs and outputs of ML model 16. Collecting and labeling data samples for training ML model 16 may be time consuming and expensive, providing a potential attacker motivation to extract the model. Distinguisher 12 is provided to detect an attempt to extract ML model 16 so that the owner of the model can take appropriate action to defend against the attack, such as deny access to ML model 16, provide random outputs, or some other appropriate action.

To detect an attempted attack, during inference operation of trained first ML model 16, input samples intended for trained ML model 16 are first provided to distinguisher 12. Distinguisher 12 has an input for receiving input samples (INPUT SAMPLE). In response to an input sample, distinguisher 12 either provides the input sample to ML model 16 at a first output or provides an indication of attack at a second output labeled "PROVIDE INDICATION OF NON-PROBLEM DOMAIN INPUT SAMPLE". Distinguisher 12 includes a trained ML model 14 that is trained to classify the input samples as PD samples or NPD samples. Samples that are classified as PD samples can be provided to trained first ML model 16 for classification. Samples that are classified as NPD samples may be an indication of an attempt to extract ML model 16. During normal usage of ML model 16, it is expected that occasionally, a NPD input sample will be provided by a legitimate user of ML model 16, so an indication of an attack may not be provided based on only occasional NPD input samples. However, a large number of NPD samples provided in a relatively short time frame may be an attack in progress, so an indication may be output at the second output of distinguisher 12. In another embodiment, another criterion may be used to determine when an attack is in progress.

To create distinguisher 12, a large dataset is needed to train ML model 14. Preferably the large dataset includes only NPD data and no PD data. However, because the large dataset is intended to be used to train other distinguishers, it is likely the large dataset includes data that will be interpreted as PD data. In order to train ML model 14 to be an effective distinguisher, much of the PD data is filtered out so that an NPD dataset remains. Note that not enough NPD data, or too few different classes of NPD data, may result in the distinguisher labeling too much NPD data as PD data. On the other hand, not removing enough PD data may result in ML model 14 labeling PD data as NPD data. The former case is preferred over the latter case. To provide the training dataset for training ML model 14, another ML model (not shown) is used. The ML model used for filtering the training dataset should be able to classify a dataset into many classes. In one embodiment, a publicly available dataset may be used to provide the large dataset, and the ML model may be a pretrained publicly available ML model. For example, a large publicly available dataset may be the ImageNet dataset compiled by Stanford Vision Lab, Stanford University, and Princeton University with 1000 classes of data. The publicly available pre-trained ML model may be, for example, the Inception V3 network. The Inception V3 network is a convolutional neural network available from Google LLC. In another embodiment, another option for the ML model may be preferred. For example, a user may collect, or already have collected, a plurality of samples and a ML model to train using the plurality of samples. Hierarchical classifications for the dataset filtering ML model output is useful to help classify the dataset. The hierarchical classifications provide flexibility in the choice for the first and second plurality of classifications of the first and second datasets.

Once trained, the ML model used for filtering the dataset and the associated dataset may be re-used for training other distinguishers that need to be trained on similar datasets as ML model 14 and dataset used to protect ML model 16.

Figure 2:
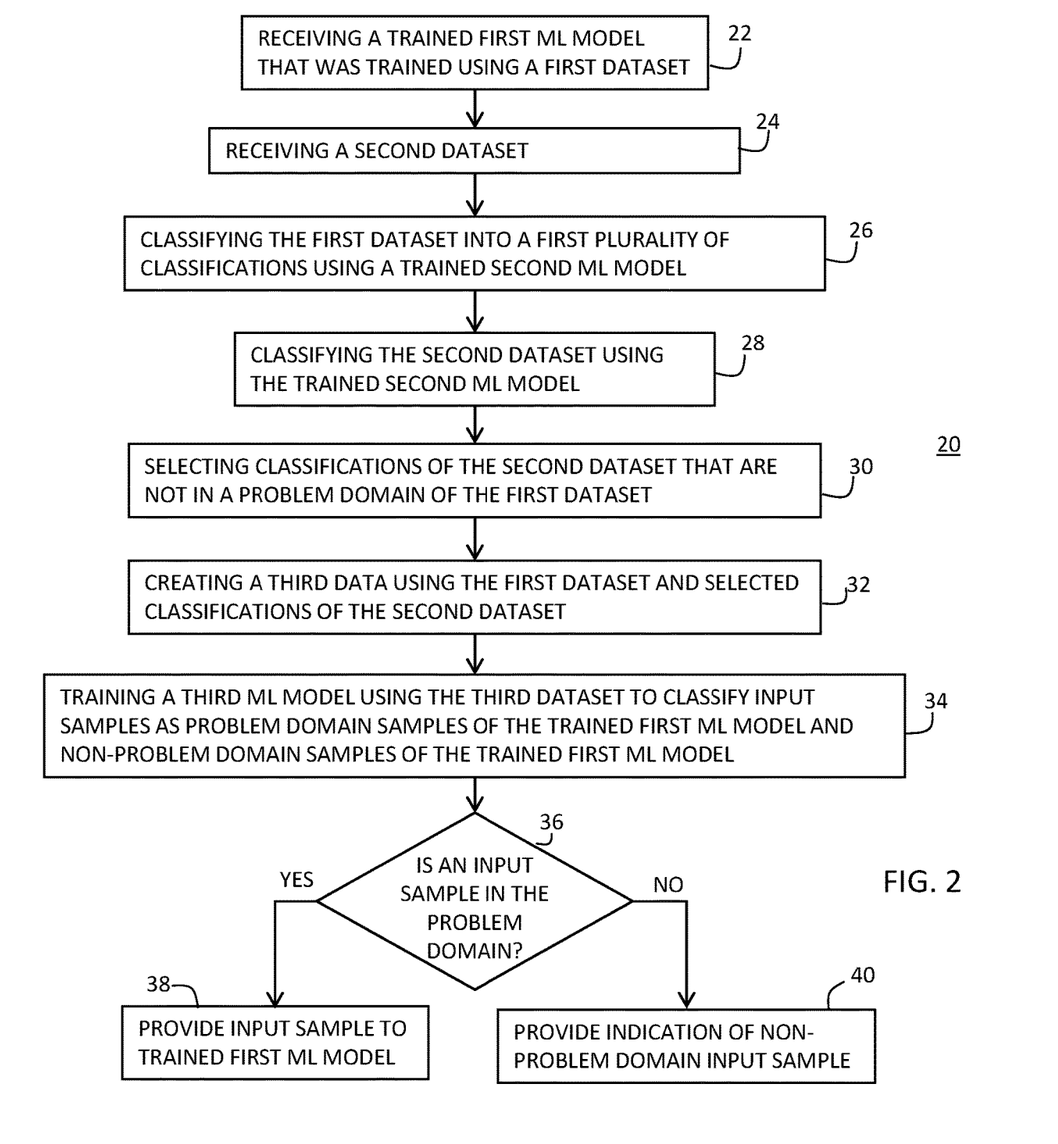
FIG. 2 illustrates a flowchart of a method for protecting a ML model from extraction in accordance with an embodiment.

FIG. 2 illustrates a flowchart of method 20 for protecting a machine learning model from extraction in accordance with an embodiment. Method 20 begins at step 22. The method may be performed by the owner of the ML model requiring protection, or by the company providing access to the ML model for ML as a service, or another party. At step 22, a trained first ML model to be protected from extraction is received. In addition, the training dataset used for training the first ML model, a test dataset, and validation dataset is received. At step 24, a second dataset is received. Typically, the second dataset is a large dataset that includes a lot of NPD data as well as some PD data. The second dataset may be provided by the same party that provided the first ML model, however, it is expected the second dataset will be provided by a different party. In one embodiment, the publicly available ImageNet dataset is used as the second dataset. At step 26, a trained second ML model is used to classify the first dataset used for training the first ML model into a first plurality of classifications. Also, full output vectors for each sample may be provided along with a likelihood or confidence level in the classification. At step 28, the trained second ML model is used to classify the second dataset into a second plurality of classifications. Preferably, the trained second ML model can classify or filter the input samples into a large number of classifications. The publicly available pre-trained Inception V3 network may be used to classify the first and second datasets in steps 26 and 28. At step 30, classifications of the second dataset are compared with classifications of the first dataset. Classifications of the first dataset are assumed to be in the PD, however that may not always be true in other embodiments. Because we are constructing a training dataset of NPD data, all the classifications of the second dataset that are not in the PD of the first dataset are selected. All the PD classifications of the second dataset are discarded for the described embodiment. Alternatively, other criteria may be chosen for selecting NPD classifications. For example, the probability vectors collected in step 26 may be used. Also, a threshold of probabilities may be used, where all classes below the threshold are chosen to be in the second dataset. In addition, a predetermined number of the highest probability classes of each of the PD classifications may be discarded. In another embodiment, all classes of a particular node or branch in the classification hierarchy may be excluded. At step 32, a third dataset is created from the first dataset and the selected classifications of the second dataset. In one embodiment, the number of samples in the third dataset may be set to be the substantially the same as in the first dataset. The elements that remain in the third dataset may be chosen uniformly at random or picked according to predetermined distribution. For example, when picking the predetermined distribution, a probability may be computed that NPD candidates are from the classifications of the first dataset. Smaller probabilities may be picked for inclusion in the third dataset. In another embodiment, multiple datasets may be chosen using different combinations of the criterion for selecting the third dataset. If multiple third datasets were chosen, they would be trained, and the best trained ML model would be used as the distinguisher. Also, the multiple datasets could be used to create an ensemble of ML models that would be used as a distinguisher. A PD or NPD decision could be determined based on a majority vote or other method.

At step 34, a third ML model is trained with the third dataset. The third ML model, when trained, has two outputs: a PD output and an NPD output. The third ML model is used as ML model 14 of distinguisher 12 of FIG. 1. In one embodiment, the third ML model may be a neural network or other ML algorithm. The type of algorithm may be determined by the algorithm used in the first ML model (ML model to be protected). After training, a compression tool could be used to reduce storage and increase speed. During inference operation of the first ML model (ML model 16 of FIG. 1), input samples intended for the first ML model are first input to distinguisher 12. At decision step 36, ML model 14 of distinguisher 12 determines if an input sample is in the PD of the first ML model 16. If the input sample is in the PD of ML model 16, the input sample is provided to ML model 16 as shown at step 38. If the input sample is an NPD sample, then, at step 40, an indication may be provided if it is determined that the NPD sample is likely an attempted extraction of ML model 16. In addition, a smoothing output function may be used at the output of ML model 14 so that input samples that are close to each other in a distribution of classifications would be more likely classified the same.

Figure 3:
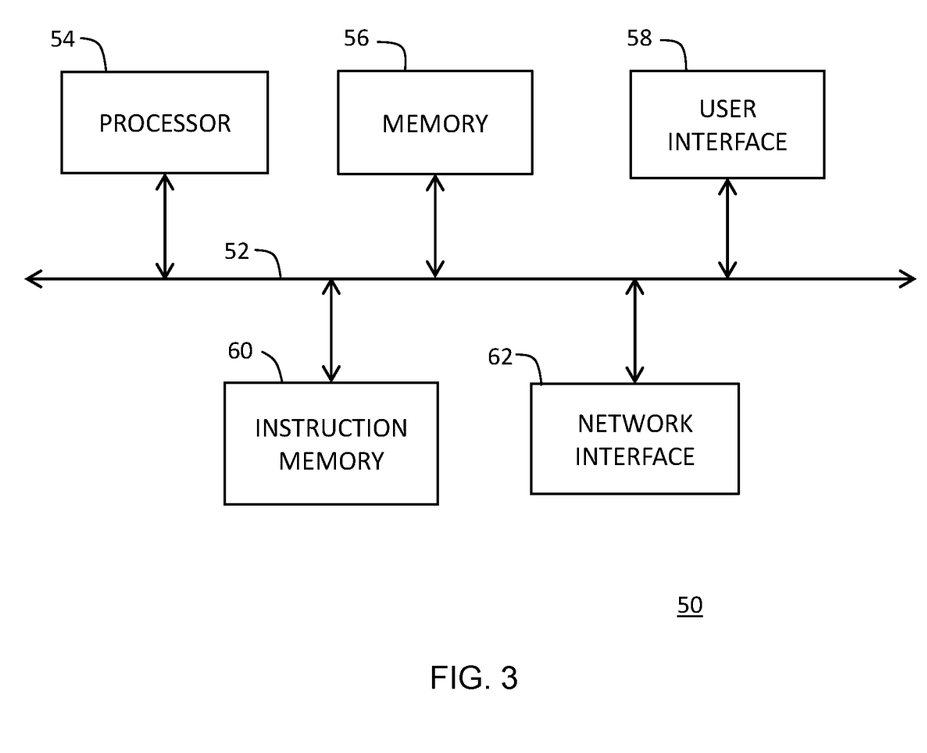
FIG. 3 illustrates a data processing system useful for implementing the method of FIG. 2.

FIG. 3 illustrates data processing system 50 useful for implementing the method of FIG. 1. Data processing system 50 may be implemented on one or more integrated circuits and may be used in an implementation of distinguisher 12. Data processing system 50 includes bus 52. Connected to bus 52 is processor 54, memory 56, user interface 58, instruction memory 60, and network interface 62. Processor 54 may be any hardware device capable of executing instructions stored in memory 56 or instruction memory 60. For example, processor 54 may execute the above-mentioned machine learning algorithms using training data stored in memory 56. Processor 54 may have multiple processing cores. Processor 54 may be, for example, a microprocessor, field programmable gate array (FPGA), application-specific integrated circuit (ASIC), or similar device. Processor 34 may be implemented in a secure hardware element and may be tamper resistant.

Memory 56 may be any kind of memory, such as for example, L1, L2, or L3 cache or system memory. Memory 56 may include volatile memory such as static random-access memory (SRAM) or dynamic RAM (DRAM), or may include non-volatile memory such as flash memory, read only memory (ROM), or other volatile or non-volatile memory. Also, memory 56 may be implemented in a secure hardware element. Alternately, memory 56 may be a hard drive implemented externally to data processing system 50. In one embodiment, memory 56 is used to store the training data.

User interface 58 may be connected to one or more devices for enabling communication with a user such as an administrator. For example, user interface 58 may be enabled for coupling to a display, a mouse, a keyboard, or other input/output device. Network interface 62 may include one or more devices for enabling communication with other hardware devices. For example, network interface 62 may include, or be coupled to, a network interface card (NIC) configured to communicate according to the Ethernet protocol. Also, network interface 62 may implement a TCP/IP stack for communication according to the TCP/IP protocols. Various other hardware or configurations for communicating are available.

Instruction memory 60 may include one or more machine-readable storage media for storing instructions for execution by processor 54, such as an implementation of the described embodiments. In other embodiments, both memories 56 and 60 may also store data upon which processor 54 may operate. Memories 56 and 60 may store, for example, one or more machine learning models, training data, or encryption, decryption, and verification applications. Memory 60 may be implemented in a secure hardware element and be tamper resistant.

Various embodiments, or portions of the embodiments, may be implemented in hardware or as instructions on a non-transitory machine-readable storage medium including any mechanism for storing information in a form readable by a machine, such as a personal computer, laptop computer, file server, smart phone, or other computing device. The non-transitory machine-readable storage medium may include volatile and non-volatile memories such as read only memory (ROM), random access memory (RAM), magnetic disk storage media, optical storage medium, NVM, and the like. The non-transitory machine-readable storage medium excludes transitory signals.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method for protecting a first machine learning (ML) model from extraction, the method comprising:
    receiving a trained first ML model that was trained using a first dataset comprising a first plurality of problem domain samples within a problem domain of the first ML model;
    receiving a second dataset comprising a plurality of samples;
    using a trained second ML model, classifying the first dataset into a first plurality of classifications, wherein each classification of the first plurality of classifications comprises one or more samples assigned to each of the first plurality of classifications;
    using the trained second ML model, classifying the second dataset as a second plurality of classifications;
    selecting classifications of the second plurality of classifications that are not classifications of the problem domain of the first dataset;

creating a third dataset comprising the first dataset and the selected classifications of the second plurality of classifications;

training a third ML model using the third dataset to classify input samples as problem domain samples of the first ML model and non-problem domain samples of the first ML model;

wherein the trained third ML model is used to distinguish whether an input sample intended as an input for the first ML model during inference operation of the first ML model, is a problem domain sample or a nonproblem domain sample;

wherein the input sample is provided to the first ML model when the input sample is classified as a problem domain sample; and wherein an indication of a likely extraction attack directed at the first ML model is provided when the input sample is classified as a non-problem domain sample.

2. The method of claim 1, wherein classifying the first dataset into a first plurality of classifications further comprises providing a confidence level that the one or more samples belongs to an assigned classification.

3. The method of claim 1, providing an indication of a likely extraction attack directed at the first ML model when the input sample is classified as a non-problem domain sample further comprises providing an indication of a likely extraction attack when the first input sample is one of a plurality of non-problem domain samples classified by the third ML model.

4. The method of claim 1, wherein the using the trained second ML model trained on the second dataset further comprises using a publicly available pretrained ML model.

5. The method of claim 1, wherein the using the trained second ML model further comprises:
collecting a plurality of data samples; and
training a ML model on the plurality of data samples to produce the second trained ML model.

6. The method of claim 1, wherein creating a third dataset further comprises selecting a plurality of samples to be removed from the third dataset so that the third dataset comprises a substantially same number of samples as the first dataset.

7. The method of claim 6, wherein selecting the plurality of samples to be removed further comprises randomly selecting the plurality of samples to be removed.

8. The method of claim 6, wherein selecting the plurality of samples to be removed further comprises selecting the plurality of samples to be removed based on an associated confidence that each of the plurality of samples to be removed belongs to an assigned classification.

9. The method of claim 6, wherein selecting the plurality of samples to be removed further comprises selecting the plurality of samples to be removed based on a distribution of the first dataset.

10. The method of claim 1, wherein the third dataset comprises images.

11. A method for protecting a first machine learning (ML) model from extraction, the method comprising:
receiving a trained first ML model trained using a first dataset comprising a first plurality of problem domain samples within a problem domain of the first ML model;
receiving a second dataset comprising a plurality of samples;
using a second trained ML model trained on the second dataset, classifying the first dataset into a first plurality of classifications, wherein each classification of the first plurality of classifications comprises one or more samples assigned to each of the first plurality of classifications;
using the second trained ML model, classifying the second dataset as a second plurality of classifications;
selecting classifications of the second plurality of classifications that are not classifications of the problem domain of the first dataset;
creating a third dataset comprising the first dataset and the selected classifications of the second plurality of classifications;
training a third ML model using the third dataset to classify input samples as problem domain samples of the first ML model and non-problem domain samples of the first ML model;
wherein the trained third ML model is used to distinguish whether a plurality of input samples intended as an input for the first ML model during inference operation of the first ML model, are problem domain samples or non-problem domain samples;
wherein each of the input samples are provided to the first ML model that are classified as problem domain samples; and
wherein an indication of a likely extraction attack directed at the first ML model is provided when a predetermined number of input samples are classified as non-problem domain samples.

12. The method of claim 11, wherein classifying the first dataset into a first plurality of classifications further comprises providing a confidence level that the one or more samples belongs to an assigned classification.

13. The method of claim 11, wherein using a second trained ML model further comprises using a publicly available pretrained ML model.

14. The method of claim 11, wherein using a second trained ML model further comprises:
collecting a plurality of data samples; and
training a ML model on the plurality of data samples to produce the second trained ML model.

15. The method of claim 11, wherein creating a third dataset further comprises selecting a plurality of samples to be removed from the third dataset so that the third dataset comprises a substantially same number of samples as the first dataset.

16. The method of claim 15, wherein selecting the plurality of samples to be removed further comprises randomly selecting the plurality of samples to be removed.

17. The method of claim 15, wherein selecting the plurality of samples to be removed further
comprises selecting the plurality of samples to be removed based on an associated confidence that each of the plurality of samples to be removed belongs to an assigned classification.

18. The method of claim 15, wherein selecting the plurality of samples to be removed further comprises selecting the plurality of samples to be removed based on a distribution of the first dataset.

19. The method of claim 11, further comprising implementing the method using a computer program comprising executable instructions that, when executed by a processor, carry out the method.

20. A non-transitory machine-readable storage medium comprising a computer program, the computer program comprising executable instructions for protecting a first machine learning (ML) model from extraction, the computer program comprising:

instructions for receiving a trained first ML model trained using a first dataset comprising a first plurality of problem domain samples within a problem domain of the first ML model;

instructions for receiving a second dataset comprising a plurality of samples;

instructions for using a second trained ML model, classifying the first dataset into a first plurality of classifications, wherein each classification of the first plurality of classifications comprises one or more samples assigned to each of the first plurality of classifications;

instructions for using the second trained ML model, classifying the second dataset as a second plurality of classifications;

instructions for selecting classifications of the second plurality of classifications that are not classifications of the problem domain of the first dataset;

instructions for creating a third dataset comprising the first dataset and the selected classifications of the second plurality of classifications;

instructions for training a third ML model using the third dataset to classify input samples as problem domain samples of the first ML model and non-problem domain samples of the first ML model;

wherein the trained third ML model is used to distinguish whether an input sample intended as an input for the first ML model during inference operation of the first ML model, is a problem domain sample or a nonproblem domain sample;

wherein the input sample is provided to the first ML model when the input sample is classified as a problem domain sample; and wherein an indication of a likely extraction attack directed at the first ML model is provided when the input sample is classified as a non-problem domain sample.

\* \* \* \* \*